US011714892B2

(12) United States Patent
Rodriguez (10) Patent No.: US 11,714,892 B2
(45) Date of Patent: Aug. 1, 2023

(54) AGE VERIFICATION

(71) Applicant: Yoti Holding Limited, London (GB)

(72) Inventor: Francisco Angel Garcia Rodriguez, London (GB)

(73) Assignee: Yoti Holding Limited, London (GB)

( * ) Notice: Subject to any disclaimer, the term of this patent is extended or adjusted under 35 U.S.C. 154(b) by 0 days.

(21) Appl. No.: 17/133,535

(22) Filed: Dec. 23, 2020

(65) Prior Publication Data

US 2021/0117656 A1 Apr. 22, 2021

Related U.S. Application Data

(63) Continuation of application No. PCT/EP2019/067231, filed on Jun. 27, 2019.

(30) Foreign Application Priority Data

Jun. 28, 2018 (GB) ..................................... 1810639

(51) Int. Cl.
*G06F 21/36* (2013.01)
*G06V 40/16* (2022.01)
(Continued)

(52) U.S. Cl.
CPC ............ *G06F 21/36* (2013.01); *G06V 40/161* (2022.01); *G06V 40/172* (2022.01); *G06V 40/45* (2022.01); *G06V 40/15* (2022.01); *G06V 40/178* (2022.01)

(58) Field of Classification Search
CPC .... G06V 40/172; G06V 10/56; G06V 40/161; G06V 40/45; G06V 40/15; G06V 40/178;
(Continued)

(56) References Cited

U.S. PATENT DOCUMENTS 7,319,779 B1* 1/2008 Mummareddy ..... G06V 40/172
382/118
7,606,401 B2* 10/2009 Hoffman ................. G07F 7/025
713/181
(Continued)

FOREIGN PATENT DOCUMENTS

CN 104 537 353 A 4/2015
WO WO 2011/116514 A1 9/2011
(Continued)

OTHER PUBLICATIONS

International Search Report and Written Opinion for Application No. PCT/EP2019/067231 dated Oct. 14, 2019 in 11 pages.
(Continued)

*Primary Examiner* — Wesley J Tucker
(74) *Attorney, Agent, or Firm* — Knobbe, Martens, Olson & Bear, LLP (57) ABSTRACT

Image processing systems and methods are provided for authorizing the performance at a computer terminal of an age-restricted activity. An estimated human age is determined based on human characteristics of a structure detected in an image captured at the computer terminal. It is determined whether the structure exhibits at least one liveness characteristic indicating the human characteristics from which the estimated human age is determined have been captured directly from a living human at the computer terminal. A positive determination is made as to whether performance of the age-restricted activity is authorized if the estimated human age meets a predetermined age requirement and the structure is determined to exhibit at least one liveness characteristic, and a negative determination is made if: i) the estimated human age does not meet the predetermined age requirement; and/or ii) the structure is not determined to exhibit at least one liveness characteristic.

13 Claims, 3 Drawing Sheets

(51) Int. Cl.
*G06V 40/40* (2022.01)
*G06V 40/10* (2022.01)

(58) Field of Classification Search
CPC .......... G06Q 20/4014; G06Q 20/40145; A47F
9/047; G06F 21/32; G06F 21/36; G07F
9/026; G07G 1/0036; H04L 63/0861
See application file for complete search history.

(56) References Cited

U.S. PATENT DOCUMENTS

| | | |
|---|---|---|
| 2013/0031623 A1 | 1/2013 | Sanders |
| 2015/0288668 A1* | 10/2015 | Kupper ................. H04L 67/306 |
| | | 726/4 |
| 2015/0348046 A1* | 12/2015 | Battle ................... G06Q 20/12 |
| | | 705/44 |
| 2016/0063314 A1* | 3/2016 | Samet ................ G06F 21/6218 |
| | | 348/78 |
| 2019/0014999 A1* | 1/2019 | Yuen ................... G06V 40/166 |

FOREIGN PATENT DOCUMENTS

| WO | WO 2016/036494 A1 | 3/2016 |
|---|---|---|
| WO | WO 2020/002539 A1 | 1/2020 |

OTHER PUBLICATIONS

International Preliminary Report for Patentability for Application No. PCT/EP2019/067231 dated Dec. 29, 2020 in 6 pages.

* cited by examiner

AGE VERIFICATION

TECHNICAL FIELD

This disclosure relates to automated age verification.

BACKGROUND

From time to time people need to prove some aspect of their identity, and often the most compelling way to do this is with a passport or other national photo ID such as a driving license or (in jurisdictions which mandate them) an identity card. However whilst these documents are greatly trusted due to the difficulty involved in making fraudulent copies and their issuance by government institutions, they are also sufficiently valuable that it is preferable not to have to carry them everywhere with us. An important aspect of this is age verification.

Systems for automated age verification are known. For example, in a digital identity service provided under the name "Yoti", at the time of writing, an image of a user may be captured and transmitted to a back-end service storing user credentials (e.g. passport information) which can then identify the user and verify their age. Facial recognition is used to match a selfie taken by the user with an identity photo on the passport or other ID document.

A user can store selected credential(s), such as an 18+ attribute, with others based on QR codes. The fact that the 18+ attribute is derived from the user's passport or other trusted identity document, which in turn has been matched to the user biometrically, makes this a highly robust automated age verification mechanism.

SUMMARY

Although highly robust, the system above does require a user device such as a smartphone with network connectivity in order to perform the age verification. The invention provides age verification mechanism which uses age estimation where possible. The invention can for example be used to provide an extension of the system outlined above, with clear-cut cases being determined from age estimation. If age estimation cannot be used to verify that a user meets an age requirement with sufficient confidence, the system can revert to alternative age verification, such as that outlined above.

In accordance with a first aspect of the present invention, there is provided a method of authorizing the performance at a computer terminal of an age-restricted activity, the method comprising the following steps, implemented in an image processing system: receiving image data of at least one image captured at the computer terminal; processing the image data of the at least one image to determine whether performance of the age-restricted activity is authorized, by: detecting a structure in the at least one image having human characteristics; determining an estimated human age based on the human characteristics; and determining whether the structure in the at least one image exhibits at least one liveness characteristic indicating the human characteristics from which the estimated human age is determined have been captured directly from a living human at the computer terminal; and wherein said determination is positive if the estimated human age meets a predetermined age requirement and the structure is determined to exhibit at least one liveness characteristic, and negative if: i) the estimated human age does not meet the predetermined age requirement; and/or ii) the structure is not determined to exhibit at least one liveness characteristic.

Thus, a positive determination is only made if the system is sufficiently confident that the human characteristics have been captured directly from a living human that meets the age requirement (as opposed to, e.g. a photograph of an older person presented by the user in a spoofing attempt).

In embodiments, the method may comprise initiating a further age verification procedure in the case that the determination is negative.

The further age verification procedure may comprise: receiving an age-related identity attribute associated with a user of the computer terminal, and verifying a source of the age-related identify value.

If the determination is negative, an alert may be outputted in response.

The at least one liveness characteristic may indicate the structure is three-dimensional.

The at least one liveness characteristic may comprise a physiological signature.

The physiological signature may be a heartbeat detected from skin colour changes in the at least one image.

The camera is a thermal imaging camera.

The at least one image may be a video image.

The method may comprise a step of providing an output at the computer terminal, wherein the liveness characteristic is an expected response to the output.

The output may be randomised.

The method may be performed in response to determining that a user is attempting to purchase an age-restricted item.

The age-related identity attribute may be obtained by: outputting at the computer terminal a code for capturing at a user device, the code associated with the computer terminal; receiving at the digital identity system a message which includes the code as captured at the user device; accessing a digital identity comprising the age-related attribute based on the message and using the code to transmit the age-related attribute to the computer terminal.

The verification step may comprise verifying the age-related identity attribute has been captured from an authentic identity document.

In accordance with another aspect disclosed herein, there is provided a method of estimating an age of a user, the method comprising the following steps, implemented in an image processing system: receiving at least one thermogram captured at a computer terminal; processing the at least one thermogram by: detecting a structure in the at least one thermogram having human characteristics; determining an estimated human age based on the human characteristics.

Detecting a structure in the at least one thermogram having human characteristics necessarily implies that a living human is present because such characteristics are only identifiable due to temperate differences across the image. A (non-living) picture of a human does not exhibit such temperature variations. That is, presence of human characteristics in a thermal image implies liveness without needing to perform an explicit separate liveness test.

Another aspect of the invention provides an image processing system comprising an input configured to receive image data of at least one image captured at the computer terminal; and one or more processors configured to apply an of the steps disclosed herein to the image data.

The input may be in the form of a network interface for receiving the image data from the computer terminal, which is remote from the image processing system.

A computer terminal may be provided, which comprises: an image capturing device for capturing images; and the image processing system which is configured to apply the above steps to image data of an image captured by the image capture device.

Another aspect of the invention provides a computer program product comprising computer-executable code embodied on a computer-readable storage medium configured so as when executed by one or more processing units to perform any of the steps disclosed herein.

DESCRIPTION

In many situations it is important to be able to verify the age of a person. For example, when the person is attempting to purchase an age-restricted item (such as alcohol) or enter an age-restricted age (such as a nightclub). The exact age limits vary from country to country and are subject to change but, for example, it is illegal in the United Kingdom to sell tobacco products to anyone under the age of eighteen. Traditionally, age verification has been done manually by having an authorized person check a physical photographic identity document which specifies the birth date of the person. However, this can be time-consuming. Furthermore, the customer may not own a photographic identity card, or may not have it on their person.

Take, for example, a customer attempting to purchase an age-restricted product from a retailer. The retailer may have one or more "self-checkouts" (or self-checkout terminals). A self-checkout is an integrated sales point where the customer performs the job of the cashier themselves by scanning product(s) and providing payment. As the customer scans products for purchase, they are added to a virtual "shopping basket". When the customer has added all the products he or she wishes to purchase to the shopping basket, the customer proceeds to a payment screen and pays for the products. In an example of a prior art system, if one or more of the products is an age-restricted product, the self-checkout will identify this when the product is scanned and prompt the customer to participate in an automated age-verification process.

Systems relating to automated age verification are known. However, these require a person wishing to verify their age to submit a photograph of themselves to a back-end service. This means that the person requires an electronic device such as a smartphone with a network connection. This may not always be the case. The present invention aims to provide an automated age verification method which is able to operate in such circumstances.

In an example of the present invention, at least one image is captured and processed to determine whether performance of the age-restricted activity is authorized. For example, a camera mounted at or on a computer terminal may capture an image of a person attempting to purchase an age-restricted product. A structure having human characteristics is detected in the image and an estimated human age is determined based on the human characteristics. Further, it is determined whether the structure in the image exhibits at least one liveness characteristic indicating that the human characteristics from which the estimated human age is determined have been captured directly from a living human at the computer terminal. The determination is positive if the estimated human age meets a predetermined age requirement and the structure is determined to exhibit at least one liveness characteristic. The determination is negative if the estimated human age does not meet the predetermined age requirement; the structure is not determined to exhibit at least one liveness characteristic; or the estimated human age does not meet the predetermined age requirement and the structure is not determined to exhibit at least one liveness characteristic.

In other words, the self-checkout determines if the customer is older than the threshold age (i.e. the age limit for purchasing that product) and performs a liveness detection process (described in more detail below to determine whether the entity on which the age detection process is performed is a living human. For example, the liveness test may comprise identifying three-dimensional detail in the image captured by the camera. This makes it harder for the customer to spoof their age, e.g. by holding up a picture of an older person to the camera.

If the customer passes both an age threshold and the liveness test, then the self-checkout can automatically permit the purchase. If not, the self-checkout can initiate a further verification process such as requiring the customer to participate in an automated age-verification process as known in the art (described below with reference to FIG. 3). Alternatively or additionally, the self-checkout may prompt an employee of the retailer to perform a manual age verification.

Figure 1:
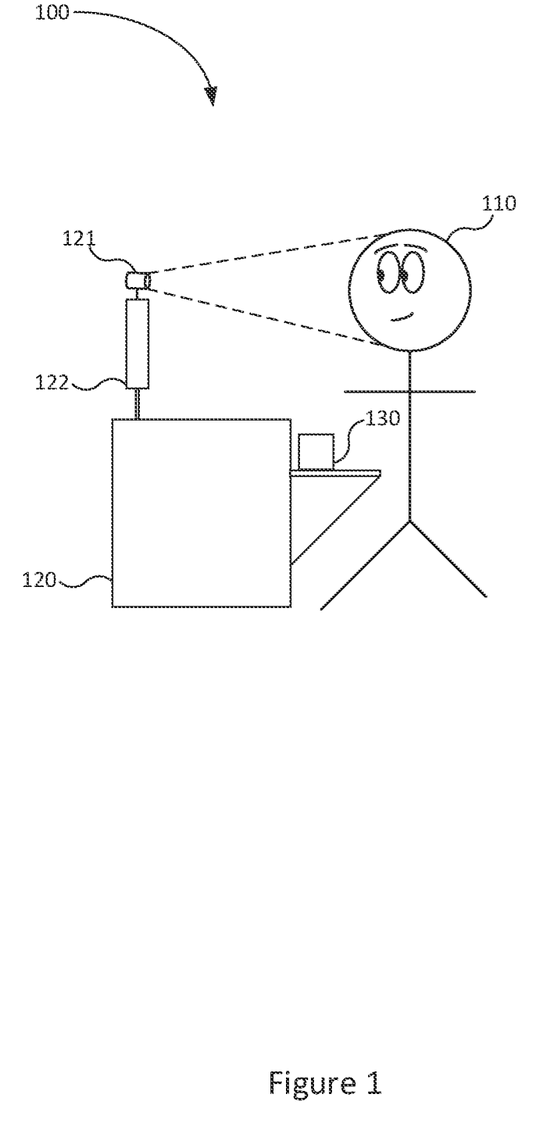
FIG. 1 shows schematically a user purchasing an item from a retailer.

FIG. 1 shows an example of a self-checkout setup 100 in which a customer 101 is using a self-checkout 120 to purchase a product 130. The self-checkout setup 100 may be, for example, located within a retailer. The product 130 in this example is an age-restricted product such as alcohol, tobacco, etc. meaning that the retailer must verify that the customer 110 is old enough to purchase the product 130 before allowing the customer 110 to do so. In other words, there is a threshold age (e.g. eighteen years old) associated with the product 130, and the customer 110 must be this age or older in order to be permitted to purchase the product 130. If the customer 110 is younger than the threshold age, the customer 110 is not allowed to purchase the product 130.

The self-checkout 120 may be provided with a touch-screen 122 as shown in FIG. 1 which allows the customer 110 to interact with the self-checkout 120. A scanner is also provided (not shown in FIG. 1) to allow the customer 110 to scan products to add them to a shopping basket, as known in the art. Once scanned, a product is added to a list of items to be purchased which may be displayed on the touchscreen 122. Once the customer 110 has added all the products he or she wishes to purchase to the shopping basket by scanning them, the customer 110 proceeds to a payment screen and provides payment for the products.

A camera 121 is provided (mounted on the self-checkout 120 in this example) for capturing an image of the customer 110. For example, the camera 121 may be arranged to capture images of the face of the customer 110. One or more captured images captured by the camera 121 may be a static image or a video image. In either case, at least one captured image is used to perform an age detection process as described below in relation to FIG. 2.

Figure 2:
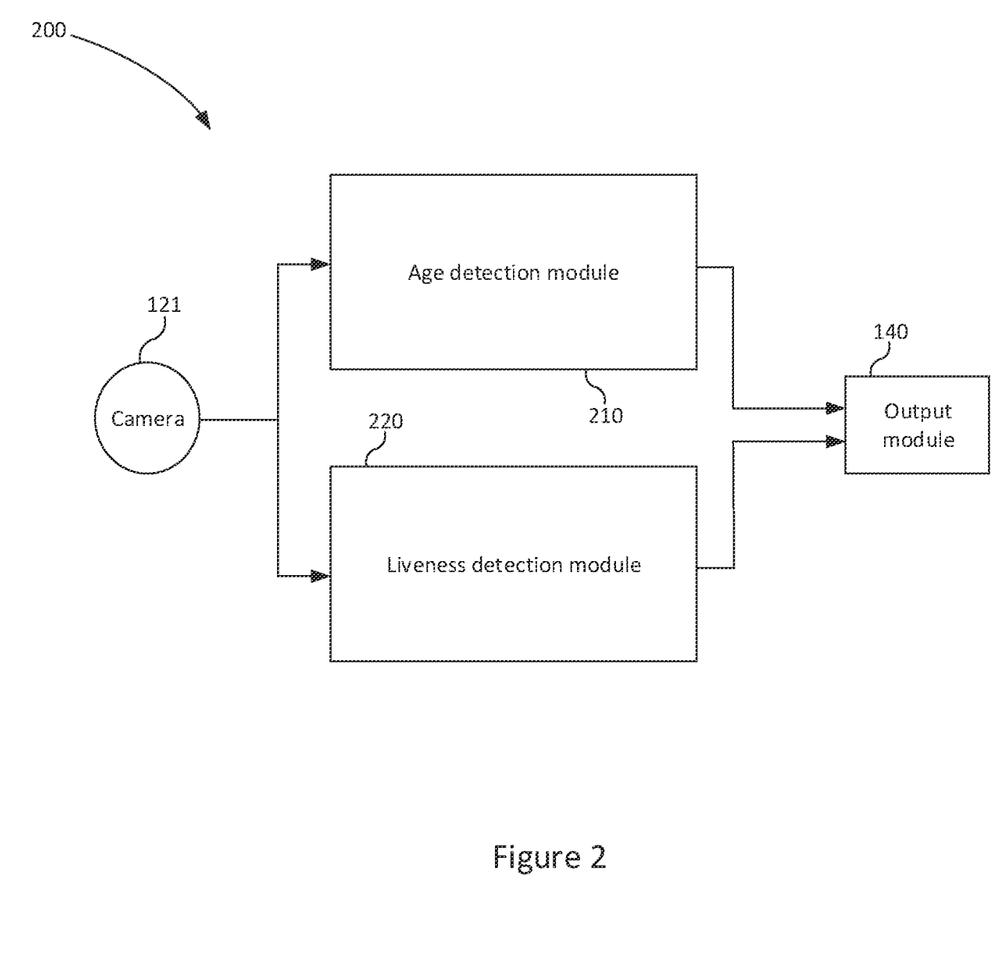
FIG. 2 shows schematically an age verification system.

FIG. 2 shows an image processing system 200 in accordance with an example of the present invention. In this example, the system comprises a camera 121, an age detection module 210, a liveness detection module 220, and an output module 140.

The age detection module 210 is operatively coupled to the camera 121 and the output module 140. The liveness detection module 220 is also operatively coupled to the camera 121 and the output module 140.

The camera 121 shown in FIG. 2 is understood to be the camera 121 shown in FIG. 1. That is, the camera 121 is constructed and arranged to capture images of the customer 110 as described above. The age detection module 210 comprises computer-executable code (software) configured, so as when run on one or more processing units, to perform the steps described herein. The age detection module 210 may be implemented at the self-checkout 120 itself or on a computer device separate from the self-checkout 120. Similarly, the liveness detection module 220 also comprises computer-executable code (software) configured, so as when run on one or more processing units, to perform the steps described herein. The liveness detection module 220 may be implemented at the self-checkout 120 itself or on a computer device separate from the self-checkout 120. The liveness detection module 220 and age detection module 210 as described separately herein, and so it is understood that they may each be implemented on a separate computer device. However, it is not excluded that a single computer device may be configured to implement the functionality of both the age detection module 210 and the liveness detection module 220. The functions represented by modules 210 and 220 can be implemented locally at the self-checkout terminal (or other computer terminal at which the image of the user is captured), or as part of a remote service to which the image is transmitted for processing.

In operation, the camera 121 captures at least one image of the customer 110 which is sent to the age detection module 210. The at least one image is also sent to the liveness detection module 220.

The age detection module 210 is configured to receive image data of the at least one image and perform an age detection process on the at least one image to determine an estimated age of the customer 110. To do so, the age detection module 210 processes the at least one image to detect a structure in the image having human characteristics (e.g. a set of facial points). From this set of human characteristics, the age detection module 210 can determine an estimated human age using techniques known in the art. For example, the age detection module 210 may apply an age classification algorithm based on machine learning techniques known in the art. Other methods of estimating an age of a person from an image of the person are known in the art. In any case, the age detection module 210 generates, using the age detection process, an estimated age for the customer 110. The estimated age may be associated with an error value, e.g. "22 years old±2 years". The estimated age is sent from the age detection module 210 to the output module 140. Alternatively or additionally, it may be associated with a confidence score.

The liveness detection module 220 may also processes image data of the at least one image to detect a structure in the image having human characteristics. In an alternative example, the liveness detection module may receive the structure having human characteristics from the age detection module 210. In any case, the liveness detection module 220 is configured to determine a liveness attribute indicating the human characteristics have been captured directly from a living human. "Liveness detection" refers to techniques of detecting whether an entity, which may exhibit what are ostensibly human characteristics, is actually a real, living being or is a non-living entity masquerading as such.

The term "image data of a captured image" can refer to all or part of the image itself (raw image data) or data derived from the image (such as a feature vector etc.) in a pre-processing step, which can be performed at the image processing system, or remote from it (e.g. at the computer terminal when remote from the image processing system).

The liveness detection process applied by the liveness detection module 220 comprises checking for the presence of at least one liveness characteristic of the customer 110 from the at least one image of the customer 110. This may be done, for example, by detecting 3D facial structure in the captured image. One specific example of this is involves detecting motion of 3D landmark points on the captured facial structure. That is, in a video image of a moving (e.g. rotating) face, the distances between points such as the eyes, ears, nose, mouth, etc. will be seen to vary in the image as the face moves if the face is indeed 3D. This allows 3D structure to be detected using a 2D camera. Alternatively, 3D imaging can be used, such as stereoscopic imaging, or using infrared arrays etc.

In another example, the image is a video image and the liveness detection module 220 may determine that the customer 110 in the video image is alive by detecting skin colour variations (e.g. blushing or skin colour changes indicative of a heart beat) or some other physiological signal. In general, any test which allows a live human to be distinguished from a non-live but human-like entity (such as a picture of a human) may be used. Alternatively or additionally, the liveness detection module 220 may be configured to determine a liveness of the customer 110 using a separate camera from the camera 121 used by the age determination module 210.

Another form of test is based on "challenge-response", wherein an output is provided to elicit a response from a user of the self-checkout terminal, and the system checks for an expected response in the image(s). The output may be randomised to make the test harder to spoof. For example, the user may be asked to say a randomly selected word, and the system may check for lip movement matching that word in a captured video image.

International patent application published as WO 2017/025573, which is incorporated herein by reference in its entirety, discloses various forms of liveness test that may be applied to a captured image, any one or more of which (in any combination) can be applied in this context.

In another example, the camera 120 is an infrared camera. In such cases, the liveness detection module 220 may be configured to determine a liveness of the customer 110 using at least one thermal image (thermogram) from the infrared camera. However, where age estimation is performed based on the thermal image, a separate liveness test need not be performed, as noted, because the very presence of human characteristics from which an age can be estimated implies liveness.

In any case, the liveness detection module 220 is configured to generate an indication or whether or not the expected liveness characteristic(s) are present. This indication is sent from the liveness detection module 220 to the output module 140.

The output module 140 receives both the estimated age from the age detection module 210 and the liveness indication from the liveness detection module 220.

Firstly, the output module 140 compares the estimated age with a threshold age and determines, therefrom, if the customer 110 is younger than the threshold age. Note that the estimated age may have an error value associated with it. In these cases, the output module 140 may be configured to determine at least when the customer 110 is definitely older than the threshold age (e.g. even the lowest value within the error is older than the threshold age). That is, a minimum level of confidence may also be required for successful age verification.

If the output module 140 determines that the customer's estimated aged is (definitely) older than the threshold age and that the customer is alive, then the output module 140 may allow the purchase of that item.

Both the liveness and the age estimation can be confidence-based, wherein both attributes must be positive with sufficient confidence, e.g. confidence scores above a threshold.

Allowing the purchase may comprise the output module 140 sending an indication to the self-checkout 120 causing the self-checkout 120 to add that product 130 to the shopping basket. In alternative examples, the self-checkout 120 may function as normal unless it receives any indication from the output module 140. In these examples, the output module 140 may do nothing in response to determining that the purchase should be allowed.

In all other cases, there is some uncertainty as to whether or not the customer 110 is legally allowed to purchase the item. This is because either:

it is not possible to positively determine that the customer 110 is old enough; or b) it is not possible to positively determine that the customer 110 is alive.

That is, the customer 110 may or may not be old enough and/or the customer 110 may or may not be attempting to cheat the system (e.g. by presenting a photograph of an older person to the camera 121). In either case, this means that the customer 110 may or may not be legally allowed to purchase the item, and so further verification is required.

The output module 140 may first determine if the estimated age cannot be determined to be definitely older than the threshold age and, if so, may not need to consider the liveness state.

The output module 140 may generate an alert (e.g. via a visual or auditory alarm) in response to determining that further verification is required. For example, the alert may be to an employee of the retailer to perform a manual age verification process, e.g. by checking a photographic identity card of the customer 110.

In an alternative or additional example, the output module 140 may instigate a further age verification process which does not require input from an employee of the retailer. For example, the customer 110 may carry an electronic device such as a smart phone with them. Such a device can be used to interact with the self-checkout 120 to perform a further age verification process, as described below with reference to FIG. 3.

Reference is made to International patent application published as WO2016/128569 and United States patent application published as: US2016/0239653; US2016/0239657; US2016/0241531; US2016/0239658; and US2016/0241532, each of which is incorporated herein by reference in its entirety. The further age verification process can be carried out by sharing an age-related identity attribute (e.g. date of birth or 18+ attribute etc.) with the self-checkout terminal as described therein. In this context, a trusted digital identity system provides the attribute, which is also anchored to a passport or other authenticated identity document. The digital identity system and the ID document are both trusted sources of identity information, allowing the identity attribute to be verified by verifying its source. The identity storing process is summarised below in the present context.

Figure 3:
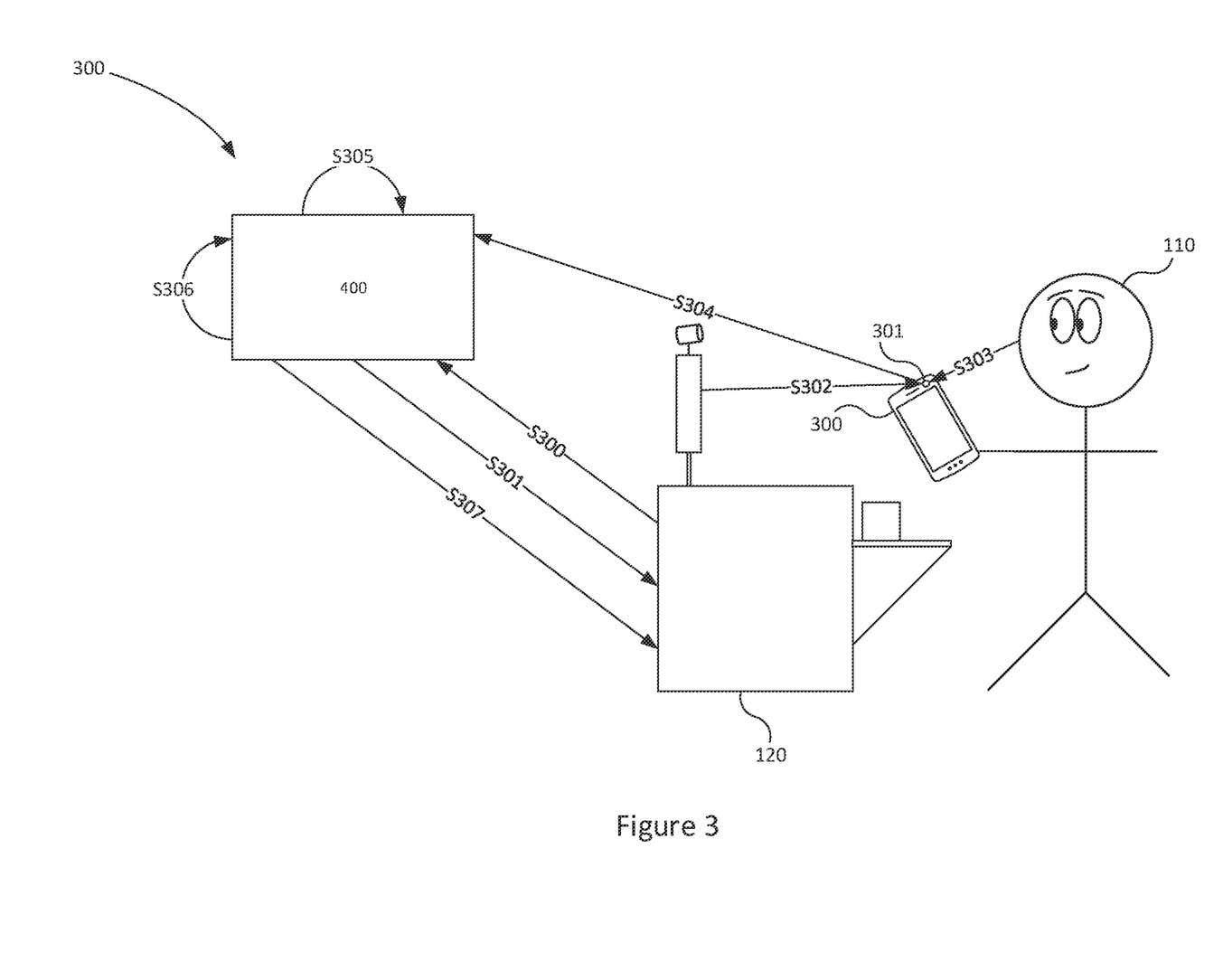
FIG. 3 illustrates schematically an age verification technique.

FIG. 3 shows the self-checkout setup described above in relation to FIG. 1. In this example, the customer 110 has a personal electronic device which in this case is a smartphone 300. The smartphone 300 comprises a camera 301. Additionally, FIG. 3 shows a digital identity system 400. The digital identity system 400 and self-checkout 120 are arranged to communicate via a wired and/or wireless connection such as via the Internet. The digital identity system 400 and smartphone 300 are arrange to communicate via a wired and/or wireless connection such as via the Internet.

The digital identity system 400 stores user details such as passport details. Specifically, the digital identity system 400 stores at least an association between a user ID, that user's age and an image of that user. Identity data is stored as individual identity attributes, which constitute digital identities for users of the digital identity system 400. This includes biometric attributes, such as facial images, as well as other identity attributes, and age-related identity attributes in particular.

In step S300, the self-checkout 120 sends a request for a sharing token to the digital identity system 400. The sharing token is code which is unique to that particular request. This may be performed in response to the customer 110 attempting to purchase an age-restricted item, e.g. this may be performed in response to the customer 110 scanning an age-restricted item, or when the customer 110 attempts to provide payment for a shopping basket containing one or more age-restricted items. Alternatively, it can be obtained any time in advance. The sharing token is associated with the self-checkout terminal within the digital identity system 400.

The sharing token is provided to the self-checkout 120 in step S301. The self-checkout 120 displays the sharing token in a manner which can be captured by a camera or output in some other way that permits capturing by a user device in the vicinity of the self-checkout terminal 120. For example, the sharing token may be displayed as a barcode or QR code on the display screen of the self-checkout 120.

In step S302, the customer 110 captures an image of the sharing token using the camera 301 of the smartphone 300 (or other electronic device).

In step S303, the customer 110 captures a self-image using the camera 301 of the smartphone 300 (or other electronic device). The self-image may be an image of the face of the customer 110 or some other biometric that can be matched to his digital identity.

In step S304, the sharing token captured in step S302 and the self-image captured in step S303 are provided to the digital identity system 400. This may be done directly, as shown in FIG. 3, if the smartphone 300 is enabled with a wireless connection (e.g. via the Internet). The self-image and sharing token are transmitted in a message which identifies at least a corresponding biometric attribute and an age-related attribute of the digital identity. For example, the message may comprise one or more database keys which allow these to be identified in a database. The purpose of obtaining the corresponding biometric is to biometrically authenticate the user by comparison with the self-image.

In step S305, the digital identity system 400 uses the message to access the digital identity of the customer 110. The profile comprises an indication of the age of the customer 110, in the form of the above age-related identity attribute.

In step S306, the digital identity system 400 compares the self-image with a corresponding biometric of the digital identity. If these match, the digital identity system 400 provides an age attribute to the self-checkout terminal in step S307, using the sharing token as received in the message.

Although described with reference to self-checkouts in particular, it is understood that the systems and methods described herein could also be applied to normal (non-self) checkouts to alleviate the requirement of the cashier performing an age verification check every time a customer attempts to purchase an age-restricted product. The invention can be implemented in any context where age-verification is required, such as making online purchases, or accessing age-restricted content etc.

Whilst the above has been described in terms of specific embodiments, these are not exhaustive. The scope is not limited by the described embodiments but only by the following claims.

The invention claimed is:

1. A method of authorizing performance at a computer terminal of an age-restricted activity, the method comprising, as implemented in an image processing system:
receiving image data of at least one image captured at the computer terminal;
processing the image data of the at least one image to determine whether performance of the age-restricted activity is authorized, by:
detecting a structure in the at least one image having human characteristics;
determining an estimated human age based on the human characteristics; and
determining whether the structure in the at least one image exhibits at least one liveness characteristic indicating the human characteristics from which the estimated human age is determined have been captured directly from a living human at the computer terminal, said determination being positive if the estimated human age meets a predetermined age requirement and the structure is determined to exhibit at least one liveness characteristic, and negative if:
i) the estimated human age does not meet the predetermined age requirement; and/or
ii) the structure is not determined to exhibit at least one liveness characteristic; and
in response to the determining that the structure in the at least one image does not exhibit at least one liveness characteristic, initiating a further age verification procedure;
wherein the further age verification procedure comprises receiving an age-related identity attribute associated with a user of the computer terminal, and verifying a source of the age-related identity attribute;
wherein the source of the age-related identity attribute is one of:
a digital system storing the age-related attribute associated with the user,
wherein the age-related identity attribute is verified by the digital system based on capturing the age-related identity attribute from a physical identity document; and
the physical identity document, the age-related identity attribute captured from the physical identity document; and
wherein the age-related identity attribute is obtained by:
outputting at the computer terminal a code for capturing at a user device, the code associated with the computer terminal;
receiving at the digital identity system a message which includes the code as captured at the user device; and
accessing a digital identity comprising the age-related attribute based on the message and using the code to transmit the age-related attribute to the computer terminal.

2. A method according to claim 1, wherein said verifying comprises verifying the age-related identity attribute has been captured from an authentic identity document.

3. A method according to claim 1, wherein if the determination is negative, an alert is outputted in response.

4. A method according to claim 1, wherein the at least one liveness characteristic indicates the structure is three-dimensional.

5. A method according to claim 1, wherein the at least one liveness characteristic comprises a physiological signature.

6. A method according to claim 5, wherein the physiological signature is a heartbeat detected from skin colour changes in the at least one image.

7. A method according to claim 1, wherein the at least one image is captured by a thermal imaging camera.

8. A method according to claim 1, wherein the at least one image is a video image.

9. A method according to claim 1, comprising a step of providing an output at the computer terminal, wherein the liveness characteristic is an expected response to the output.

10. A method according to claim 9, wherein the output is randomised.

11. A method according to claim 1, when performed in response to determining that a user is attempting to purchase an age-restricted item.

12. An image processing system for authorizing performance, at a computer terminal, of an age-restricted activity, the image processing system comprising:
an input configured to receive image data of at least one image captured at the computer terminal; and
one or more processors configured to process the image data to determine whether performance of the age-restricted activity is authorized by:
detecting a structure in the at least one image having human characteristics;
determining an estimated human age based on the human characteristics; and
determining whether the structure in the at least one image exhibits at least one liveness characteristic indicating the human characteristics from which the estimated human age is determined have been captured directly from a living human at the computer terminal, said determination being positive if the estimated human age meets a predetermined age requirement and the structure is determined to exhibit at least one liveness characteristic, and negative if:
i) the estimated human age does not meet the predetermined age requirement; and/or
ii) the structure is not determined to exhibit at least one liveness characteristic; and
if the structure in the at least one image does not exhibit at least one liveness characteristic, initiating a further age verification procedure;
wherein the further age verification procedure comprises receiving an age-related identity attribute associated with a user of the computer terminal, and verifying a source of the age-related identity attribute;
wherein the source of the age-related identity attribute is one of:
  a digital identity system storing the age-related attribute associated with the user, wherein the age-related attribute is verified based on a captured physical identity document; and
  a physical identity document, the age-related identity attribute captured from the identity document; and
wherein the age-related identity attribute is obtained by:
  outputting at the computer terminal a code for capturing at a user device, the code associated with the computer terminal;
  receiving at the digital identity system a message which includes the code as captured at the user device; and
  accessing a digital identity comprising the age-related attribute based on the message and using the code to transmit the age-related attribute to the computer terminal.

13. One or more on-transitory computer-readable storage medium comprising computer executable code for authorizing performance at a computer terminal of an age-restricted activity, the computer-executable code configured so as when executed by one or more processing units to implement operations comprising:
  receiving image data of at least one image captured at the computer terminal;
  processing the image data of the at least one image to determine whether performance of the age-restricted activity is authorized, by:
    detecting a structure in the at least one image having human characteristics;
    determining an estimated human age based on the human characteristics; and
    determining whether the structure in the at least one image exhibits at least one liveness characteristic indicating the human characteristics from which the estimated human age is determined have been captured directly from a living human at the computer terminal, said determination being positive if the estimated human age meets a predetermined age requirement and the structure is determined to exhibit at least one liveness characteristic, and negative if:
      i) the estimated human age does not meet the predetermined age requirement; and/or
      ii) the structure is not determined to exhibit at least one liveness characteristic; and
  if the structure in the at least one image does not exhibit at least one liveness characteristic, initiating a further age verification procedure;
wherein the operations further comprises receiving an age-related identity attribute associated with a user of the computer terminal, and verifying a source of the age-related identity attribute;
wherein the source of the age-related identity attribute is one of:
  a digital identity system storing the age-related attribute associated with the user, wherein the age-related attribute is verified based on a captured physical identity document; and
  a physical identity document, the age-related identity attribute captured from the identity document; and
wherein the age-related identity attribute is obtained by:
  outputting at the computer terminal a code for capturing at a user device, the code associated with the computer terminal;
  receiving at the digital identity system a message which includes the code as captured at the user device; and
  accessing a digital identity comprising the age-related attribute based on the message and using the code to transmit the age-related attribute to the computer terminal.

* * * * *